Patented July 4, 1950

2,514,194

UNITED STATES PATENT OFFICE 2,514,194

NEOPRENE-POLYBUTADIENE FREEZE-RESISTANT COMPOSITION

Delbert C. Cline, Silver Lake, Ohio, assignor to The Firestone Tire & Rubber Company, Akron, Ohio, a corporation of Ohio No Drawing. Application September 8, 1944, Serial No. 553,281

4 Claims. (Cl. 260—41.5)

This invention relates to improved soft vulcanized rubbery compositions.

Certain synthetic rubber-like materials have been found superior to natural rubber compositions for many specific uses. Among these rubber-like materials is neoprene, a synthetic rubber derived from the polymerization or copolymerization of chloroprene, a halogenated conjugated diolefin, otherwise known as 2-chloro-1,3-butadiene. The chloroprene polymers now occur in several variations wherein some particular quality is emphasized in each species. The neoprenes are in general superior to natural rubber or its substitutes, when aging in sunlight is the primary concern. A typical example of rubber articles subject to the severe action of sunlight is the increasingly large number of rubber installations on exposed portions of aircraft. Many natural rubber installations of this type have failed prematurely in service because of the deteriorating effect of the sunlight thereon. Consequently, neoprene preparations have been used in deicers, fabric coatings on balloons, life boats, pontoons, and air spring bellows. Chloroprene polymers also possess excellent oil and heat resistance when compounded properly. They are, therefore, often a preferred material for the fabrication of motor supports, hose, gaskets, diaphragms, or other articles requiring rubber-like construction and commonly exposed to oil in motors, turbines, mobile equipment and the like. In these uses and many others, neoprene is also valuable for its flame resistance. It does not support combustion except in the presence of a decomposing or gasifying temperature. Fire hazard at its worst has been considerably reduced in the operation of aircraft, tanks, military vehicles, and all types of auxiliary serving equipment for the same. Further safety through the uses of these chloroprene polymers or copolymers is derived from their impermeability to gases. They are readily utilized in the construction of gas containing paraphernalia, such as lighter-than-air aircraft, hoses, tank linings, and poisonous-gas resistant clothing.

The neoprenes, while possessing all of these qualities in addition to a tensile strength almost equal to natural rubber, are inferior to natural rubber and many of its substitutes in freeze resistance. Human mechanical activities are now being extended to the polar regions, the substratosphere and presently, perhaps, to the stratosphere. The service limits, as to low temperature, of the rubber-like materials are rapidly being approached and in many instances exceeded. Most of the elastomers may be compounded with softeners and so achieve new low temperature service ranges, but as greater amounts of the softeners are used so are the physical properties of the elastomer lowered. For uses in which the strength or elongation must be preserved in the presence of low temperature, softeners, as they now exist, do not meet the growing need for elastomers, efficient in high altitude and polar environments.

It is an object of this invention to provide synthetic rubber compositions which have superior physical properties to other synthetic rubbers when compounded for use at subzero temperatures. Another object is to provide synthetic rubber compositions which are efficient as elastomers at temperatures below those in which present elastomers can function. It is an object also to achieve great freeze-resistance without the loss of desirable physical properties, such as have been heretofore expended in compounding rubber-like materials for low temperatures. Other objects will become obvious as the invention is described.

The objects of the invention are achieved by mixing neoprene with polybutadiene. This new synthetic rubber composition is found to have superior tensile strength, elongation, and flexibility when compared with other elastomers of similar freeze resistance, such as Buna S, Buna N, rubber, or their blends. The freeze resistance of compositions including neoprene and polybutadiene may be varied according to design requirements. Since tensile and elongation are reduced somewhat by increasing the proportion of polybutadiene mixed with neoprene, preparation of these mixtures may be governed by the lowest temperatures anticipated for a particular use.

The unexpected feature of this invention arises out of the advantages obtained when polybutadiene is substituted for softeners or plasticizers used as brittle point depressants. The following four examples which are suitable as stocks for spreading on fabric, will illustrate the utility of this invention when polybutadiene is used in place of Circo Light Oil, a naphthenic base petroleum product with an aniline point of approximately 160° F. and a Saybolt viscosity of 160 seconds at 100° F.

Freeze resistance has been determined and measured, in the development of this invention by observing the temperature at which brittleness occurred, as the sample was gradually refrigerated. Brittle points were determined in the standard Bell Telephone Laboratory brittleness tester which in principle involves suddenly bending a small slab of elastomer approximately $\frac{1}{16}''$ thick through a 90° angle over a $\frac{1}{2}''$ round rod submerged in a bath at controlled temperature.

Examples 1 to 4 are as follows:

| Ingredient | Example | | | |
|---|---|---|---|---|
| | 1 | 2 | 3 | 4 |
| | Parts | Parts | Parts | Parts |
| Neoprene | 400 | 360 | 240 | 280 |
| Polybutadiene | | 40 | | 120 |
| Circo Light Oil | | | 160 | |
| Sulfur | 1.6 | 1.6 | 1.6 | 1.6 |
| Zinc oxide | 10.0 | 10.0 | 10.0 | 10.0 |
| Stearic acid | 4.0 | 4.0 | 4.0 | 4.0 |
| Carbon black | 62.9 | 62.9 | 62.9 | 62.9 |
| Dibenzothiazyl disulfide | 3.2 | 3.2 | 3.2 | 3.2 |
| Light calcined magnesia | 12.8 | 12.8 | 12.8 | 12.8 |
| Candelilla wax | 1.5 | 1.5 | 1.5 | 1.5 |
| Phenyl-beta-naphthylamine | 4.0 | 4.0 | 4.0 | 4.0 |
| | 500.0 | 500.0 | 500.0 | 500.0 |
| Brittle point in °F | −38 | −46 | −46 | −80 |
| Tensile strength, lbs./sq. in | 3,400 | 3,100 | 1,700 | 1,750 |

All samples were heat cured.

These four formulas are identical except for the neoprene-plasticizer ratio. In the first example, no plasticizer or polybutadiene has been added and may therefore be considered the control for Examples 2, 3 and 4. Examples 2 and 3 show relative quantities of polybutadiene and Circo Light Oil respectively, to obtain an 8° F. increase in freeze resistance. It should be observed also that there was a loss of tensile strength of 300 and 1700 pounds per square inch for polybutadiene and Circo Light Oil, respectively. Examples 3 and 4 offer an interesting comparison in that almost similar tensile strengths were obtained but in Example 4 where a 70–30 ratio of neoprene to polybutadiene was used, an increase in freeze resistance of more than five fold over the Circo Light Oil formula in Example 3 resulted. A further examination of Examples 1, 2, and 3 reveals that six times more Circo Light Oil than polybutadiene per unit weight of neoprene was needed to obtain an 8° F. increase in freeze resistance and was accompanied by a great sacrifice of tensile strength where the former was used.

Polybutadiene may be substituted in neoprene compositions for other plasticizers known for their capacity to increase freeze resistance, such as the butyl esters of aliphatic acids. Invariably, polybutadiene is found to give less diminution of tensile strength when compared pound for pound with other freeze resistance agents.

The neoprene used throughout the development of this invention is a grade recommended to the trade for its tensile strength. Its manufacturers have recommended that softeners such as light process oil, dibutyl sebacate, dibutyl phthalate and di-isobutyl adipate be used to reach progressively lower brittle points. In the examples that follow, further illustration of the advantages accruing from the substitution of polybutadiene for these softeners will be demonstrated.

Polybutadiene as used in this invention may be prepared in a manner similar to large scale Buna S polymerization. One hundred sixty parts of water are mixed with five parts of sodium oleate and 0.3 part potassium persulfate. With this solution are mixed 1.0 part dodecyl mercaptan and 100 parts 1,3 butadiene. These ingredients are polymerized under pressure in a closed, agitated vessel at 122° F. until 80% conversion of the 1,3 butadiene has occurred. Whereupon, the emulsion containing the dispersed polybutadiene is dropped to a stripping tank, 2% phenyl-beta naphthylamine is added as a stabilizer, and the unpolymerized 1,3 butadine is removed by vacuum distillation. The latex may then be coagulated with a 4% aluminum sulfate solution. This coagulum after being dried will yield a value of approximately 50 when tested on the Mooney plastometer. Plasticity values of the polymer, however, are not critical to the practice of this invention.

Other examples illustrating the practice of this invention are as follows:

Examples 5 to 8 inclusive show variation in the neoprene-polybutadiene ratio in compositions suitable as a tire tread stock.

| | Examples | | | |
|---|---|---|---|---|
| | 5 | 6 | 7 | 8 |
| Neoprene-butadiene ratio | 90/10 | 80/20 | 70/30 | 60/40 |
| Pigments | Parts | Parts | Parts | Parts |
| Neoprene | 360 | 320 | 280 | 240 |
| Polybutadiene | 40 | 80 | 120 | 160 |
| Sulfur | .8 | 1.6 | 2.4 | 3.2 |
| Zinc oxide | 10.0 | 10.0 | 10.0 | 10.0 |
| Stearic acid | 4.0 | 4.0 | 4.0 | 4.0 |
| Channel black | 120.0 | 120.0 | 120.0 | 120.0 |
| Piperidinium pentamethylene dithiocarbamate | 0.4 | 0.4 | 0.4 | 0.4 |
| Dibenzothiazyl disulfide | 2.6 | 3.2 | 3.8 | 4.4 |
| Light calcined magnesia | 14.4 | 12.8 | 11.2 | 9.6 |
| Candelilla wax | 1.5 | 1.5 | 1.5 | 1.5 |
| Phenyl-beta naphthylamine | 4.0 | 4.0 | 4.0 | 4.0 |
| | 557.7 | 557.5 | 557.3 | 557.1 |
| Tensile, lbs./sq. in | 3,075 | 2,625 | 1,800 | 1,500 |
| Modulus at 200% elongation | 1,050 | 1,250 | 1,100 | 975 |
| Elongation in percent | 450 | 390 | 350 | 270 |
| Brittle point in °F | −45 | −65 | −80 | −80 |

Examples 9, 10, 11, and 12 are identical with Examples 5, 6, 7, and 8, respectively except that P33 soft black has been substituted for Channel Black.

| | Examples | | | |
|---|---|---|---|---|
| | 9 | 10 | 11 | 12 |
| Tensile, lbs./sq. in | 2,600 | 2,350 | 1,975 | 1,500 |
| Modulus at 200% elongation | 525 | 425 | 400 | 350 |
| Elongation in percent | 680 | 600 | 550 | 480 |
| Brittle point in °F | −50 | −68 | −80 | −85 |

In Examples 13 to 17, inclusive, stocks suitable for use in inner tubes are compared. In Example 13 the synthetic rubber polymer consists entirely of neoprene without the aid of a liquid plasticizer. In Examples 14 and 15 the synthetic rubber polymer is entirely neoprene but is accompanied by a liquid plasticizer equal to 10% of the weight of the neoprene. In Examples 16 and 17 polybutadiene is substituted for portions of the neoprene in Example 13.

|  | Examples | | | | |
|---|---|---|---|---|---|
| Pigments | 13 | 14 | 15 | 16 | 17 |
| | Parts | Parts | Parts | Parts | Parts |
| Neoprene | 100 | 100 | 100 | 90 | 80 |
| Dibutyl sebacate (liquid plasticizer) | | | 10 | | |
| Dibutyl phthalate (liquid plasticizer) | | 10 | | | |
| Polybutadiene | | | | 10 | 20 |
| Piperidinium pentamethylene dithiocarbamate | 0.16 | 0.16 | 0.16 | 0.16 | 0.16 |
| Phenyl-beta-naphthylamine | 2.00 | 2.00 | 2.00 | 2.00 | 2.00 |
| Stearic acid | 3.00 | 3.00 | 3.00 | 3.00 | 3.00 |
| Dibenzothiazyl disulfide | 0.13 | 0.13 | 0.13 | 0.13 | 0.13 |
| Soft black (P33) | 26.00 | 26.00 | 26.00 | 26.00 | 26.00 |
| Light calcined magnesia | 8.00 | 8.00 | 8.00 | 8.00 | 8.00 |
| Zinc oxide | 5.00 | 5.0 | 5.00 | 5.00 | 5.00 |
| | 144.29 | 154.29 | 154.29 | 144.29 | 144.29 |
| Tensile in lbs./sq. in | 2,675 | 2,450 | 2,500 | 2,700 | 2,400 |
| Modulus at 200% elongation | 1,675 | 1,100 | 1,100 | 1,850 | 1,875 |
| Elongation in per cent | 670 | 650 | 660 | 560 | 500 |
| Brittle point in °F | −40 | −45 | −45 | −50 | −75 |

Examples 16 and 17 well illustrate the superiority of polybutadiene over two of the most efficient freeze resistant liquid plasticizers, as shown in Examples 14 and 15.

This formula may be considered applicable as a stock for coating fabrics for moisture and gas resistance.

|  | Example | | | |
|---|---|---|---|---|
| Pigments | 18 | 19 | 20 | 21 |
| | Parts | Parts | Parts | Parts |
| Neoprene | 400 | 360 | 320 | 280 |
| Polybutadiene | | 40 | 80 | 120 |
| Sulfur | 1.6 | 1.6 | 1.6 | 1.6 |
| Zinc oxide | 10.0 | 10.0 | 10.0 | 10.0 |
| Stearic acid | 4.0 | 4.0 | 4.0 | 4.0 |
| Carbon black | 62.9 | 62.9 | 62.9 | 62.9 |
| Dibenzothiazyl disulfide | 3.2 | 3.2 | 3.2 | 3.2 |
| Light calcined magnesia | 12.8 | 12.8 | 12.8 | 12.8 |
| Candelilla Wax | 1.5 | 1.5 | 1.5 | 1.5 |
| Phenyl-beta-naphthylamine | 4.0 | 4.0 | 4.0 | 4.0 |
| | 500.0 | 500.0 | 500.0 | 500.0 |
| Brittle points in °F | −40 | −51 | −70 | −85 |

The above samples, as all the previous samples, were found to be quite flexible to within 3° F. of their brittle points.

The examples herein described demonstrate clearly the advantages to be derived from this invention. It is shown that neoprene when mixed with polybutadiene, becomes freeze resistant without the corresponding loss of tensile strength and elongation that softeners or plasticizers produce, when used to obtain similar degrees of freeze resistance. As less polybutadiene is necessary to effectuate freeze resistance than softeners used for that purpose, a further advantage is had where it is desired to exploit fully the oil, flame or heat resistance of neoprene in that the neoprene is not substantially diluted and its inherent advantages thus nullified. The examples also disclose that polybutadiene may be mixed with neoprene in all proportions and in all types of compounds in which neoprene is used and effectually subserve the objects of this invention.

What is claimed is:

1. A soft vulcanized rubbery composition flexible at low temperatures containing 10 to 40 parts of rubbery polybutadiene prepared by polymerization to 80% conversion in aqueous emulsion at 122° F. and, respectively, 90 to 60 parts of rubbery polychloroprene.

2. A soft vulcanized rubbery composition flexible at low temperatures containing 70 to 80 parts of rubbery polychloroprene and, respectively, 30 to 20 parts of rubbery polybutadiene prepared by polymerization to 80% conversion in aqueous emulsion at 122° F.

3. A soft vulcanized rubbery composition flexible at low temperatures containing 10 to 40 parts of rubbery polybutadiene prepared by polymerization to 80% conversion in aqueous emulsion at 122° F., respectively 90 to 60 parts of rubbery polychloroprene, and carbon black.

4. A method of making a vulcanized neoprene article flexible at low temperatures, which includes mixing 90 to 60 parts of rubbery polychloroprene with respectively 10 to 40 parts of rubbery polybutadiene prepared by polymerization to 80% conversion in aqueous emulsion at 122° F., and vulcanizing the resulting mixture to produce a soft vulcanized rubbery composition.

DELBERT C. CLINE.

REFERENCES CITED

The following references are of record in the file of this patent:

UNITED STATES PATENTS

| Number | Name | Date |
|---|---|---|
| 2,279,450 | Diehl | Apr. 14, 1942 |
| 2,381,267 | Drake | Aug. 7, 1945 |
| 2,427,192 | Brovsky | Sept. 9, 1947 |

FOREIGN PATENTS

| Number | Country | Date |
|---|---|---|
| 492,998 | Great Britain | Sept. 30, 1938 |
| 705,104 | Germany | Apr. 17, 1941 |

OTHER REFERENCES

Selker et al: Pages 157–160, Ind. & Eng. Chem., Feb. 1942.

Conant et al.: Pages 767, 773, 774, Jour. of Applied Physics, Nov. 1944.

Johnson: Page 1, column 1, "Rubber Age," April 1949.

Liska: Pages 40–46, Ind. and Eng. Chem., Jan. 1944.

Scott: Pages 23–26, Feb. 1944, Jour. of Rubber Research of the Research Assn. of Br. Rub. Mfrs.

Fraser et al.: "The Neoprenes," pages 11, 12 and 13, Report No. 42–3, Sept. 1942, by Rubber Chem. Div. Du Pont, Wilmington, Del.

Neoprene Report BL-122 (4 pages), pub. Oct. 15, 1943, by Rubber Chem. Div. Du Pont.

Neoprene Report BL-149 (3 pages), pub. Mar. 25, 1944, by Rubber Chem. Div. Du Pont.